United States Patent
Bochniak

(10) Patent No.: US 9,013,514 B2
(45) Date of Patent: Apr. 21, 2015

(54) VARIABLE SPEED AUTOSCROLL SYSTEM AND METHOD

(71) Applicant: John F. Bochniak, Lake Barrington, IL (US)

(72) Inventor: John F. Bochniak, Lake Barrington, IL (US)

(*) Notice: Subject to any disclaimer, the term of this patent is extended or adjusted under 35 U.S.C. 154(b) by 109 days.

(21) Appl. No.: 13/791,588

(22) Filed: Mar. 8, 2013

(65) Prior Publication Data

US 2014/0253449 A1 Sep. 11, 2014

(51) Int. Cl.
*G06F 3/0354* (2013.01)
*G09G 5/34* (2006.01)
*G06F 3/0485* (2013.01)

(52) U.S. Cl.
CPC ............. *G06F 3/0354* (2013.01); *G09G 5/34* (2013.01); *G06F 3/0485* (2013.01)

(58) Field of Classification Search
CPC . G06F 3/03543; G06F 3/03547; G06F 3/041; G06F 3/0412; G06F 3/0481; G06F 3/04812; G06F 3/04847; G06F 3/0485; G06F 3/04855; G06F 3/0487; G06F 3/0488; G06F 17/217; G06F 3/0354; G09G 5/34
USPC .......... 715/251, 784, 785, 786; 345/156, 158, 345/173, 660, 684
See application file for complete search history.

(56) References Cited

U.S. PATENT DOCUMENTS

| | | | | |
|---|---|---|---|---|
| 5,633,657 | A * | 5/1997 | Falcon | 345/157 |
| 6,128,006 | A * | 10/2000 | Rosenberg et al. | 345/163 |
| 7,289,102 | B2 * | 10/2007 | Hinckley et al. | 345/156 |
| 7,564,444 | B2 * | 7/2009 | Rosenberg et al. | 345/156 |
| 7,623,116 | B1 * | 11/2009 | Bidiville | 345/163 |
| 2002/0118168 | A1 * | 8/2002 | Hinckley et al. | 345/163 |
| 2003/0142081 | A1 * | 7/2003 | Iizuka et al. | 345/173 |
| 2003/0210255 | A1 * | 11/2003 | Hiraki | 345/684 |
| 2004/0135770 | A1 * | 7/2004 | Hayasaka | 345/156 |
| 2006/0246940 | A1 * | 11/2006 | Foxenland | 455/550.1 |
| 2007/0254722 | A1 * | 11/2007 | Kim et al. | 455/566 |
| 2008/0082940 | A1 * | 4/2008 | Morris | 715/786 |
| 2008/0094422 | A1 * | 4/2008 | Ryu | 345/684 |
| 2009/0322793 | A1 * | 12/2009 | Tsuiki | 345/684 |
| 2010/0245395 | A1 * | 9/2010 | LeBert et al. | 345/661 |
| 2010/0269038 | A1 * | 10/2010 | Tsuda | 715/702 |
| 2010/0321411 | A1 * | 12/2010 | Paek et al. | 345/684 |
| 2011/0214087 | A1 * | 9/2011 | Nagiyama et al. | 715/784 |
| 2012/0144341 | A1 * | 6/2012 | Torigoe et al. | 715/784 |
| 2012/0218310 | A1 * | 8/2012 | Shinohara | 345/670 |
| 2012/0313977 | A1 * | 12/2012 | Kwon | 345/684 |
| 2013/0147739 | A1 * | 6/2013 | berg et al. | 345/173 |
| 2013/0268883 | A1 * | 10/2013 | Kim et al. | 715/784 |

* cited by examiner

*Primary Examiner* — Tom Sheng
(74) *Attorney, Agent, or Firm* — Law Office of Marc D. Machtinger, Ltd.

(57) ABSTRACT

A variable speed autoscroll system is disclosed. The variable speed scrolling system includes a control device, such as a scrolling wheel or other suitable control member. A user may select a scrolling speed by displacing the control member, and a non-linear increase in scrolling speed based on the degree of displacement of the control member is achieved. The control member may be disposed in a computer mouse, keyboard, or other peripheral device. In various embodiments, the user may toggle between various sensitivity levels to achieve a greater or lesser degree of increase in scrolling speed based on the amount of displacement of the control member. Optionally, the user may input the set of parameters to determine the dynamics of the system.

18 Claims, 5 Drawing Sheets

VARIABLE SPEED AUTOSCROLL SYSTEM AND METHOD

CROSS-REFERENCE TO RELATED APPLICATIONS

This application claims the benefit of U.S. Provisional Application No. 61/634,935, filed Mar. 8, 2012, which is hereby incorporated by reference herein in its entirety.

BACKGROUND OF THE INVENTION

1. Field of the Invention

The present invention relates to a variable speed scrolling device, and more particularly, to a control device to facilitate efficient and ergonomic review of large documents or data sets by providing the user with greater control over scrolling speed.

2. Background

In numerous industries and applications, various computer users need to scroll through documents, pages within documents, images, or data sets. As one example out of many, radiologists regularly view image sets in a system known as "Picture Archiving and Communication System" ("PACS"), particularly with respect to CT and MRI images. Typically, a large number of images must be viewed sequentially. This is conventionally accomplished by using a conventional device such as a scrolling wheel on a peripheral computer mouse.

Conventionally, the system used including a scroll wheel only provides for a single scrolling speed, or may be inefficient for larger documents or data sets. Thus, the user has very little control over the speed at which scrolling is accomplished. This rate may be poorly suited to the needs of the user, and the lack of control by the user is inefficient. Repeated finger movements are typically necessary to effect scrolling in conventional systems. This can lead to repetitive motion injuries.

Various systems have been proposed to address scrolling speed. For example, in U.S. Pat. No. 6,700,564, issued to McLoone et al., a wheel device is disclosed which can be moved horizontally in order to affect horizontal scrolling speed within a document. But an ergonomic system in which the user has control of scrolling speed, and in which non-linear increases may be achieved in scrolling between images is lacking.

In U.S. Pat. No. 7,173,637, issued to Hinckley et al., a scrolling wheel is disclosed in which the user may "flick" the wheel, and the degree of force used in flicking the wheel determines a scrolling speed. However, the user lacks any great degree of control over scrolling speed.

Another prior art device, known as the "Shuttle Pro V2" by Contour Design, was originally designed for video editing. It has a circular wheel which can be rotated clockwise or counterclockwise to control scrolling rates, surrounding an inner wheel which advances images uniformly, one per click. However, its design is not particularly ergonomic, and a major drawback is that a separate mouse needs to be used as there is no capability to move the cursor with this device. Other devices, such as the "Logitech VX Revolution" (and more recent "MX Revolution" and "Performance MX") mouse devices have scroll wheels which can operate in a free-spin (low friction) mode, allowing for more rapid movement through the dataset or document, with the ability to change to a click-to-click mode with a switch. However, the free-spin scroll wheel on that mouse does not allow for precise control of scrolling rates.

Various other devices have been proposed, however, there continues to be a need for a variable speed scrolling device which provides the user with greater control over scrolling speed in an ergonomic and efficient manner.

SUMMARY

The present invention is a control device adapted to allow a user to achieve a desired scrolling speed based on use of the device. The increase in scrolling speed achieved is non-linear with respect to the amount of displacement of a control member on the device.

In general terms, the invention is a control device to facilitate efficient and ergonomic review of large documents or data sets. Various professionals in numerous fields have a need to review large documents, data sets, or images, with the need to scroll through them at varying speeds. For example, in the medical industry, radiologists in particular view large image sets in a system known as "PACS," in which various CT and MRI images must be viewed. The present invention allows for precise and efficient scrolling between such images with less scrolling finger movement. Thus, an additional advantage of the present invention is that it reduces the chances of repetitive motion injuries.

In various embodiments the control device can be provided within a computer mouse or other peripheral device. Thus it is more accurate and ergonomic compared to conventional computer mouse devices. The scrolling rates are actively controlled by the user, increased or decreased by, for example, in certain embodiments, the degrees of rotation of the wheel, or wheel clicks. The autoscrolling mechanism is optionally turned on and off by a simple click of a button, such as the typical left-sided mouse button, although any such toggle button or switch could accomplish this.

In certain embodiments, from initial neutral position in autoscrolling mode, downward wheel movement generates progressive forward autoscrolling, whereas upward movement would accomplish autoscrolling in reverse. In some embodiments, autoscrolling would continue at the same rate, "hands-off," unless changed or converted to standard scroll mode. To provide more precise control in various emdodiments, the autoscrolling rate dynamics graph expressed as frame rate/sec vs. wheel movement/clicks is non-linear. For example, the dynamics may be exponential. This unique rate dynamics curve would allow for efficient acceleration of scrolling rates through large numbers of frames (large image sets for the radiologist) while maintaining the ablility for controlled deceleration with regard to review of particular items (images) of interest. Switching between standard scolling to variable speed autoscrolling ("VAS") abilities, and back again, is easily achieved as needed. Ability to move the cursor during autoscrolling mode is ideally maintained.

The autoscrolling system 10 can be implemented in various alternative ways. In certain embodiments, the basic autoscrolling control device would itself consist of a custom microprocessor and software. In certain embodiments, a standard computer mouse, optionally with a USB connection 35, can be converted to one with VAS capability as illustrated in FIG. 1. The microprocessor 30 for VAS can be connected to the standard hardware/microcontroller unit within the mouse with a USB connection, although a custom device such as a standard mouse microcontroller 25 incorporating the VAS mechanism may also be manufactured. In certain embodiments in which two internal boards might be operatively connected, as shown in FIG. 1, a USB connection or any other suitable connection may be used. Another way for a standard computer mouse to achieve VAS capability would be by connection to an external USB device 40, sometimes referred to as a "dongle," which contains the custom microprocessor 45 (FIG. 2) and USB interface devices 50 and 55. Alternatively, a wireless device using Bluetooth low energy (BTLE) technology 60 with a wireless USB dongle incorporating the custom microprocessor 30 is another possibility (see FIGS. 3 and 4).

In various embodiments, the described VAS feature may also be incorporated into a scroll wheel with a spring mechanism in that the wheel is under a gentle spring tension using spring 65 and assumes a neutral position once released (FIG. 5). A similar alternative device incorporates magnetic resistance using permanent magnets 70 to achieve the same effect (FIG. 6). This provides a smoothly controllable method of autoscrolling. VAS may also be used in a variety of other control devices, such as throttle 75, trackball 85, joystick 80, or touch scroll pad 95. Alternatively, motion or proximity sensors 90 may be used to detect finger position to achieve control of the VAS feature. The VAS control can be adapted for numerous other applications, including in game controllers.

In various embodiments, the sensitivity of the dynamics of the VAS system can be selected by the user. Thus, the user may select a dynamics set which is faster or slower based on the user's needs. FIG. 8 shows an example of three possible settings with differing sensitivities (higher sensitivity or fast response, medium, and lower sensitivity or slow). However, it is understood that any suitable settings may be incorporated into the system. The listed medium setting is close to what may be most useful for most applications and, thus, is one example of a default setting. As the graph shows, for all settings, one wheel click generates 1 frame/sec, and two clicks 2/sec. The curves then diverge; for medium setting, three, four, five, six and seven clicks generate rates of 4 frames/sec, 8/sec, 18/sec, 40/sec, and up to 100/sec, respectively. The highest potential rates, however, may be limited by the software/hardware of the application.

The rates are optionally adjusted or customized by entering specific rates per wheel click/device movement increments via the provided software. A device may also allow ability to change between different rate sensitivities by an optional switch. In addition, increments of autoscroll rate change need not be restricted to movement of a typical wheel click (i.e., 15 degrees); the device can be programmed at lower rate change increments which would achieve a "smoothing" effect on the rate curves.

Still other objects and advantages of the present invention will become readily apparent to those skilled in the art from the following detailed description, wherein it is shown and described only the preferred embodiments of the invention, simply by way of illustration of the best mode contemplated of carrying out the invention. As will be realized, the invention is capable of other and different embodiments and its several details are capable of modifications in various obvious respects, without departing from the invention. Accordingly, the drawings, wherein like reference numerals represent like features, and description are to be regarded as illustrative in nature and not as restrictive.

DETAILED DESCRIPTION OF THE INVENTION

Figure 1:
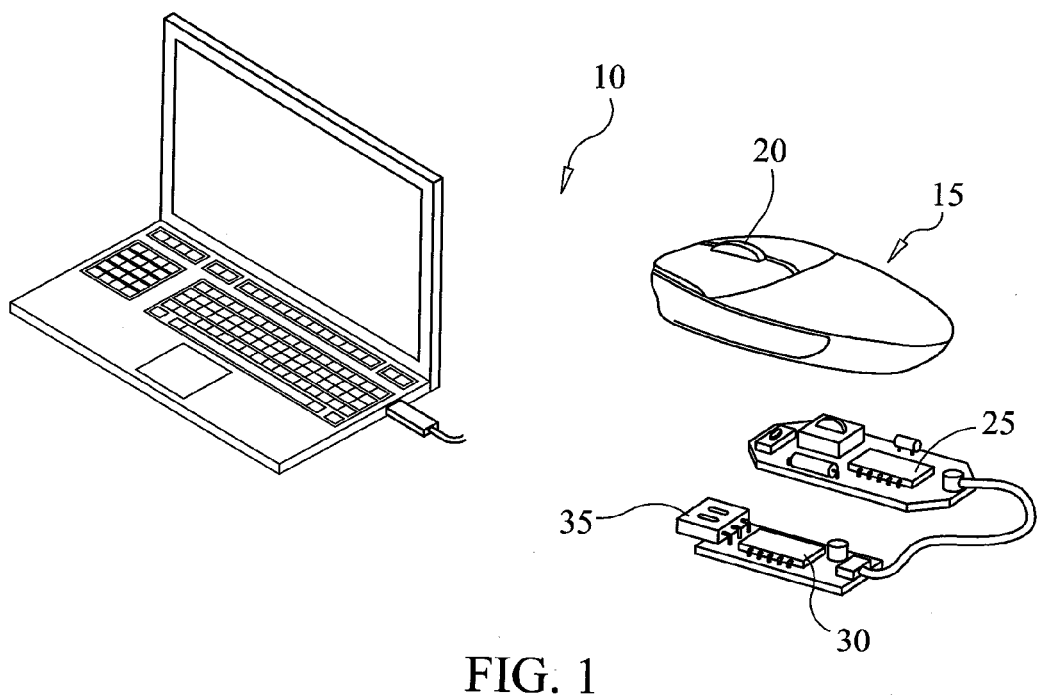
FIG. 1 shows a perspective view of one embodiment of a VAS system according to the present invention.
Figure 2:
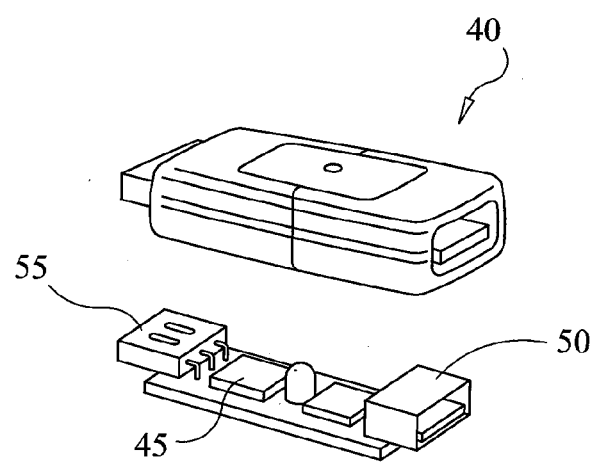
FIG. 2 shows a perspective view of one embodiment of a VAS system according to the present invention.
Figure 3:
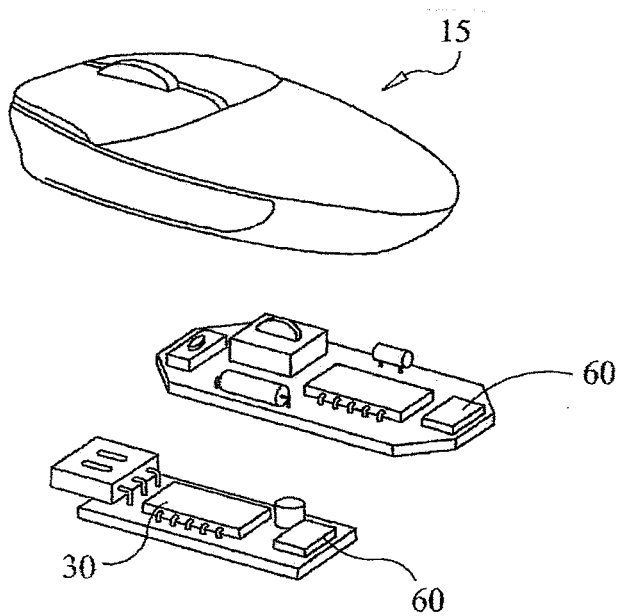
FIG. 3 shows a perspective view of one embodiment of a VAS system according to the present invention.
Figure 4:
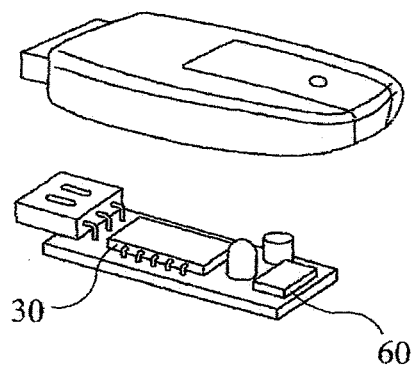
FIG. 4 shows a perspective view of one embodiment of a VAS system according to the present invention.
Figure 5:
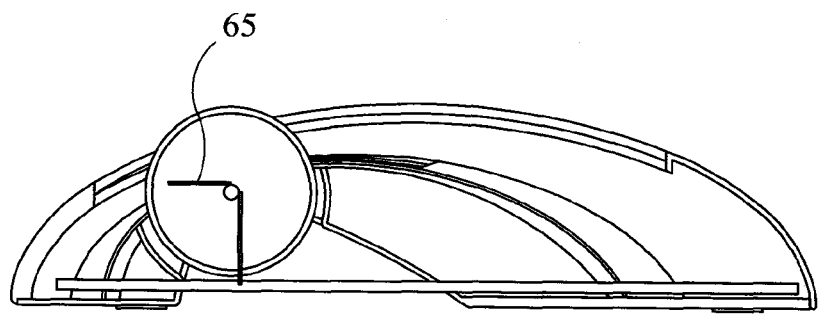
FIG. 5 shows a perspective view of one embodiment of a VAS system according to the present invention.
Figure 6:
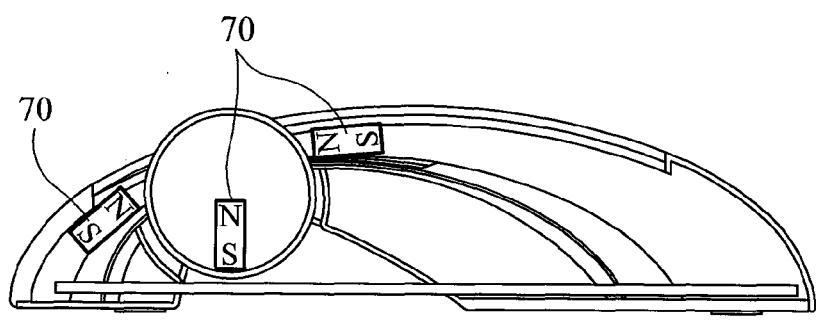
FIG. 6 shows a perspective view of one embodiment of a VAS system according to the present invention.
Figure 7A:
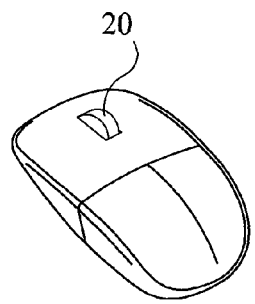
FIG. 7A shows a perspective view of one embodiment of a VAS system according to the present invention.
Figure 7B:
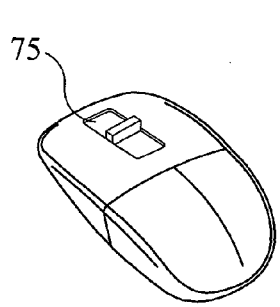
FIG. 7B shows a perspective view of another embodiment of a VAS system according to the present invention.
Figure 7C:
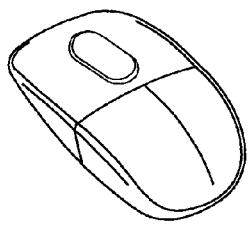
FIG. 7C shows a perspective view of another embodiment of a VAS system according to the present invention.
Figure 7D:
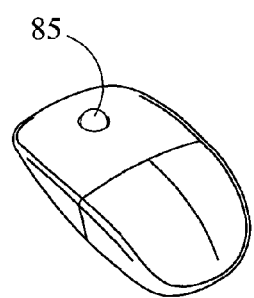
FIG. 7D shows a perspective view of another embodiment of a VAS system according to the present invention.
Figure 7E:
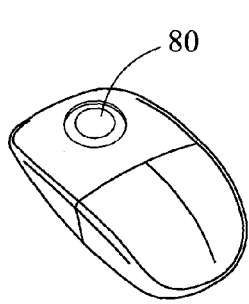
FIG. 7E shows a perspective view of another embodiment of a VAS system according to the present invention.
Figure 7F:
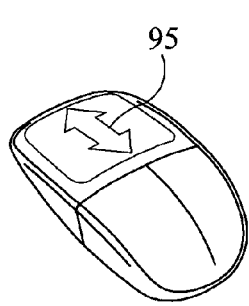
FIG. 7F shows a perspective view of another embodiment of a VAS system according to the present invention.
Figure 7G:
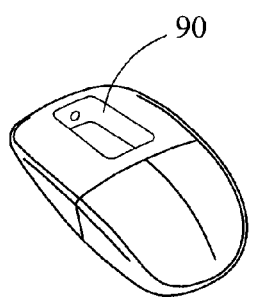
FIG. 7G shows a perspective view of another embodiment of a VAS system according to the present invention.
Figure 8:
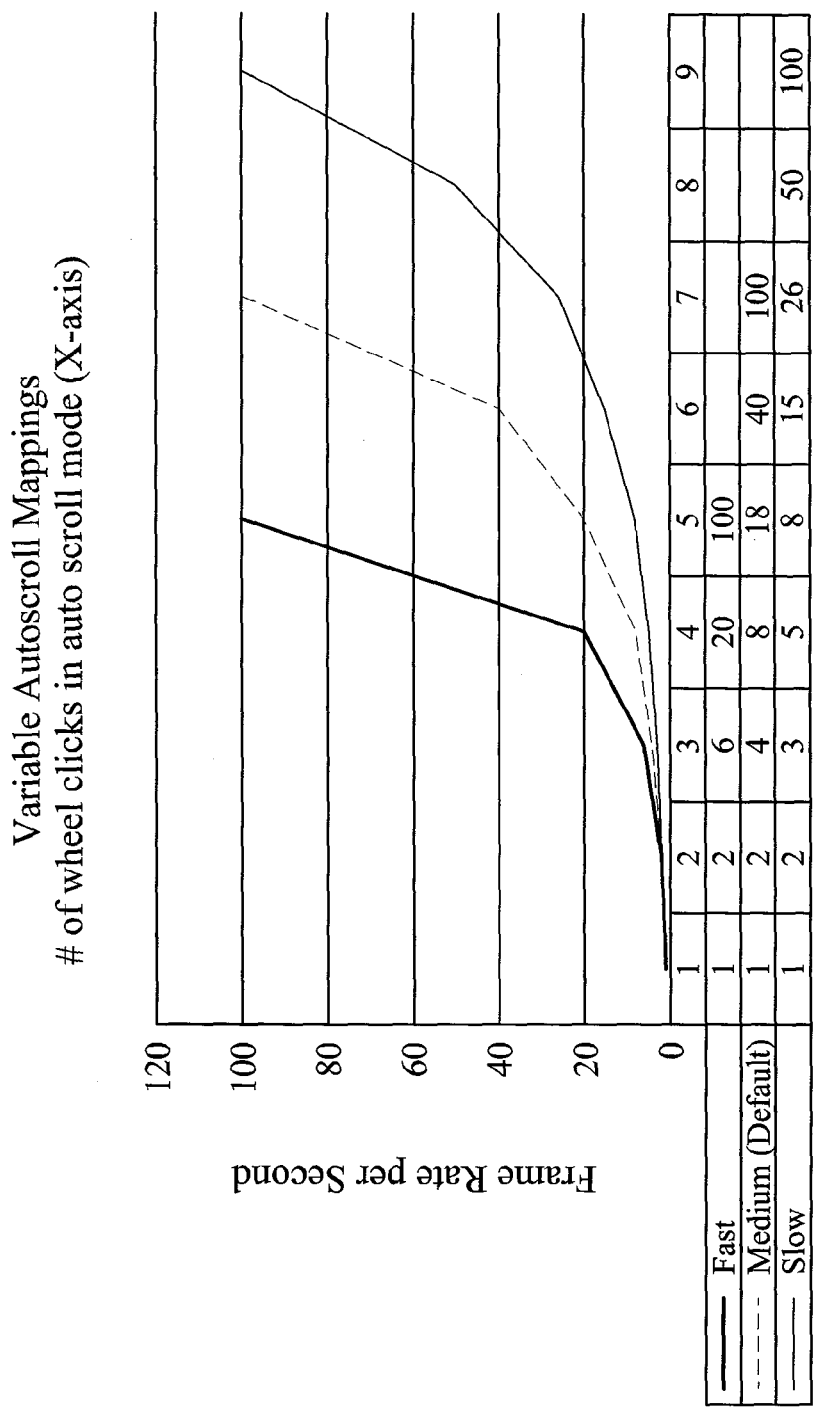
FIG. 8 shows a graph of one possible set of VAS dynamics according to the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention is a variable speed scrolling system. The system, in various embodiments, includes a user controlled device 15 having a control member 20 adapted to enable a user to select a scrolling speed from a plurality of available scrolling speeds. The device 15 is adapted to be operatively connected to a computing system having a viewing screen. The scrolling speed determines the rate at which scrolling occurs within a document or between a series of images displayed to a user on such a viewing screen when the device 15 is operatively connected to such a computing system.

In various embodiments, the control member 20 is adapted to allow the user to select the scrolling speed based on the degree of displacement of the control member 20. The degree of displacement results in a non-linear increase in the resulting scrolling speed. Optionally, the control member 20 includes a neutral position adapted to pause scrolling on the viewing screen when selected.

In certain embodiments, the control member 20 may be any of various controls such as a joy stick, track ball, throttle switch, or scrolling wheel. The degree of displacement in the case of a scrolling wheel is the degree of rotation of the scrolling wheel. Ideally, the scrolling wheel can be selectively rotated in a reverse direction, and rotation in the reverse direction causes reverse direction scrolling, which also can be achieved using a similar VAS dynamic set.

In certain embodiments, the control member 20 further includes a toggle control adapted to enable the user to toggle between a variable scrolling mode in which the plurality of scrolling speeds are accessible, and a standard scrolling mode in which repetitive user action is required for continued scrolling.

In some embodiments, such as with a scrolling wheel, releasing the wheel results in the wheel remaining in its present position with the associated scrolling speed activated.

In other embodiments, releasing the wheel results in the wheel returning to a neutral position in which scrolling is halted. This can be achieved via a spring-loaded tension wheel, a magnetic biasing, or any other suitable method.

In certain preferred embodiments, the sensitivity of the control member 20 can be selected by the user. For example, the user may set it using a control on the device 15, or using software on the computing system. A set of parameters may be chosen to select the desired sensitivity level of non-linear rates of increase. Exponential dynamics may be used, or other non-linear dynamics.

In various other preferred embodiments, the user is given a greater degree of control of the system. The user may, using software in the system, input the dynamics parameters desired so control the rate at which scrolling will occur for various different degrees of displacement of the control member 20.

As is understood, the device of the present invention may be incorporated into any suitable device, including but not limited to, a mouse, a keyboard, a joy stick 80, a gaming console, a touch screen, or any other suitable device. In various other embodiments, a touch pad 95 may be used to control scrolling speed, or a motion or proximity sensor 90 may be used. In this case, the degree of motion or position of the user's finger is sensed and is used to determine the non-linear increase in scrolling speed.

While specific embodiments have been illustrated and described, numerous modifications come to mind without significantly departing from the spirit of the invention and the scope of protection is limited by the scope of the accompanying claims.

What is claimed is:

1. A variable speed scrolling system comprising:
a user controlled device having a control member adapted to enable a user to select a scrolling speed from a plurality of available scrolling speeds, wherein said device is adapted to be operatively connected to a computing system having a viewing screen, and wherein said scrolling speed determines the rate at which scrolling occurs within a document or between a series of images displayed to such a user on such a viewing screen when said device is operatively connected to such a computing system,
wherein said control member is adapted to allow such a user to select said scrolling speed based on a degree of displacement of said control member, and wherein an increase in the degree of displacement results in a non-linear increase in a resulting scrolling speed, and
wherein said scrolling speed is selected by such a user based on a degree to which the user positions said control member, and wherein said scrolling speed is determined based on predetermined parameters which are non-linearly proportional to the degree to which the user positions said control member wherein said scrolling speed increases in a non-linear manner based on the degree to which the user positions said control member.

2. The variable speed scrolling system according to claim 1, wherein said control member includes a neutral position adapted to pause scrolling on such a viewing screen when selected.

3. The variable speed scrolling system according to claim 2, wherein said control member comprises a scrolling wheel, and wherein said degree of displacement comprises a degree of rotation of said scrolling wheel.

4. The variable speed scrolling system according to claim 3, wherein said scrolling wheel is adapted to be selectively rotated in a reverse direction, and wherein rotation in said reverse direction causes reverse direction scrolling.

5. The variable speed scrolling system according to claim 3, wherein said scrolling wheel is adapted to remain in a selected position once said position is selected by a user without such a user holding said wheel in the selected position.

6. The variable speed scrolling system according to claim 3, wherein said scrolling wheel is adapted to return itself to a neutral position from a non-neutral selected position selected by a user after such a user releases said wheel.

7. The variable speed scrolling system according to claim 6, wherein said scrolling wheel is spring-loaded to enable said wheel to return itself to said neutral position.

8. The variable speed scrolling system according to claim 6, wherein said scrolling wheel is magnetically biased to enable said wheel to return itself to said neutral position.

9. The variable speed scrolling system according to claim 2, wherein said control member further comprises a toggle control adapted to enable a user to toggle between a variable scrolling mode in which said plurality of scrolling speeds are accessible, and a standard scrolling mode in which repetitive user action is required for continued scrolling.

10. The variable speed scrolling system according to claim 2, wherein said control member comprises a throttle control switch, a trackball, or a joystick.

11. The variable speed scrolling system according to claim 2, wherein said scrolling speed increases exponentially with displacement of said control member.

12. The variable speed scrolling system according to claim 2, wherein said scrolling speed increases based on a predetermined set of non-linear parameters, and wherein a sensitivity level of said control member may be selected by such a user by selecting from a plurality of preset parameter sets.

13. The variable speed scrolling system according to claim 2, wherein said control member is disposed in a mouse device.

14. The variable speed scrolling system according to claim 2, wherein said control member is disposed in a keyboard device.

15. A variable speed scrolling system comprising:
a user controlled device having a control member adapted to enable a user to select a scrolling speed from a plurality of available scrolling speeds, wherein said device is adapted to be operatively connected to a computing system having a viewing screen, and wherein said scrolling speed determines the rate at which scrolling occurs within a document or between a series of images displayed to such a user on such a viewing screen when said device is operatively connected to such a computing system,
wherein said control member is adapted to allow such a user to select said scrolling speed based on a degree of displacement of said control member, and wherein an increase in the degree of displacement results in a non-linear increase in a resulting scrolling speed, and
wherein said scrolling speed is selected by such a user based on a degree to which the user positions said control member, and wherein such a user is enabled to input a set of parameters to determine how said scrolling speed shall be affected by various degrees of displacement of said control member.

16. A variable speed scrolling system comprising:
a user controlled device adapted to enable a user to select a scrolling speed from a plurality of available scrolling speeds, wherein said device is adapted to be operatively connected to a computing system having a viewing screen, and wherein said scrolling speed determines the rate at which scrolling occurs within a document or between a series of images displayed to such a user on such a viewing screen when said device is operatively connected to such a computing system, wherein said device is adapted to allow such a user to select said scrolling speed based on a position of a body part of such a user, and wherein an increase in the degree of displacement or movement of the body part results in a non-linear increase in a resulting scrolling speed corresponding to predetermined or input parameters.

17. The variable speed scrolling system according to claim 16, wherein the position of a such a body part is determined via a control member, and wherein said control member comprises a touch pad touchpad.

18. The variable speed scrolling system according to claim 16, wherein the position of a such a body part is determined via a control member, and wherein said control member comprises a motion or proximity sensor adapted to detect the position of a user's finger.

* * * * *